United States Patent

Dubinsky et al.

Patent Number: 5,345,682
Date of Patent: Sep. 13, 1994

[54] TUBE CUTTER

[75] Inventors: Miles J. Dubinsky, Carol Stream; Rinart Joseph, Chicago; Gust A. Saros, Rockford; Richard Locsmondy, Belvidere, all of Ill.

[73] Assignee: The Pullman Company, Lebanon, N.J.

[21] Appl. No.: 78,583

[22] Filed: Jun. 17, 1993

[51] Int. Cl.⁵ .......................... B23D 21/06
[52] U.S. Cl. ........................ 30/102; 30/94; 82/97; 82/113
[58] Field of Search .............. 30/102, 93, 96, 101, 30/108, 94; 82/97, 113; 7/157

[56] References Cited

U.S. PATENT DOCUMENTS

| | | | |
|---|---|---|---|
| 2,629,926 | 3/1953 | Franck | 30/102 |
| 3,041,723 | 7/1962 | Franck . | |
| 3,100,934 | 8/1963 | Jonasson | 30/102 |
| 3,135,050 | 6/1964 | Franck . | |
| 3,403,442 | 10/1968 | Reese et al. . | |
| 3,520,057 | 7/1970 | Gore et al. . | |
| 3,636,629 | 1/1972 | Baun | 30/94 |
| 4,345,376 | 8/1982 | Benson et al. | 30/102 |
| 4,739,554 | 4/1988 | Hytonen | 30/101 |
| 4,831,732 | 5/1989 | Garton . | |
| 5,206,996 | 5/1993 | McDaniel | 30/101 |

OTHER PUBLICATIONS

Dupont Catalog.

*Primary Examiner*—Eugenia Jones
*Assistant Examiner*—Allan M. Schrock
*Attorney, Agent, or Firm*—William Squire

[57] ABSTRACT

A tube cutter mechanism supports an arm from which a tube supporting anvil extends, the anvil being aligned with the tube cutter mechanism for cutting the supoorted tube. During cutting, an axial force is imposed on the tube and anvil. The arm is formed such that it bends in response to the force, storing energy such that rotation of the tube occurs for more than one revolution of the tube without advancing the cutter wheel. The device is formed of molded glass fiber reinforce nylon, preferably ZYTEL. In a second embodiment, the arm does not bend and the anvil is constructed so as to bend relative to the arm in response to the axial cutting force permitting rotation of the tube during cutting beyond a single revolution without advancing the cutter wheel. The anvil advantageously does not have a cutter wheel for burnishing the tube to remove oxides during cutting. In the alternative, the anvil may also have a pair of cutting wheels

23 Claims, 1 Drawing Sheet

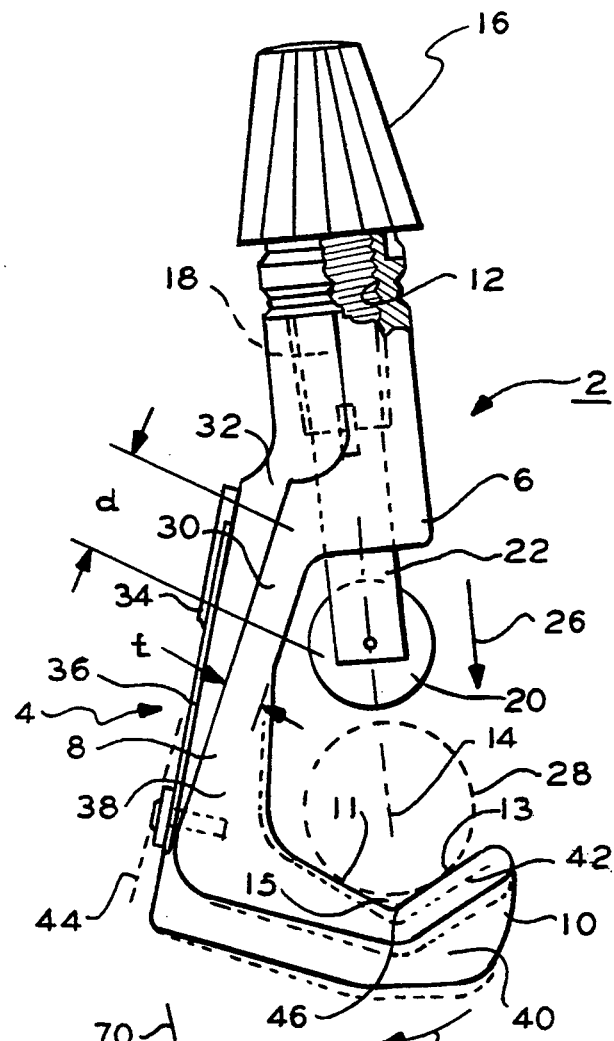
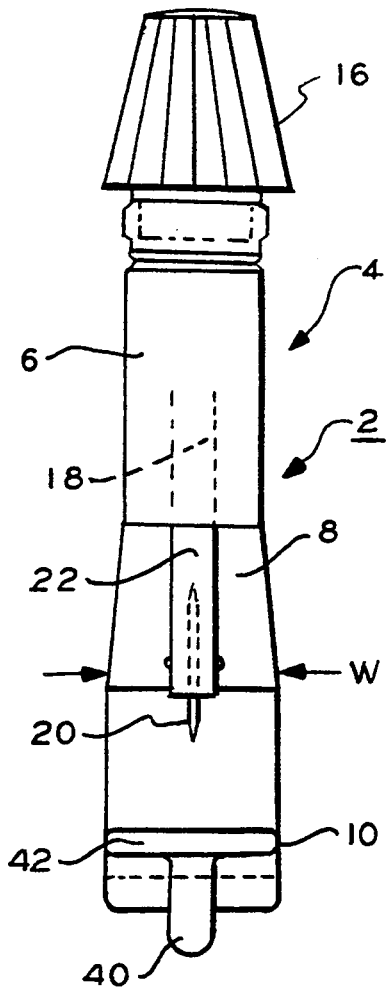
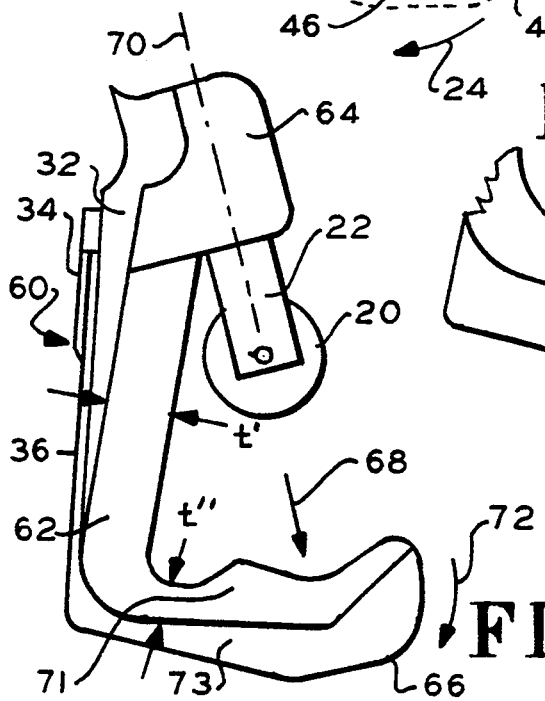
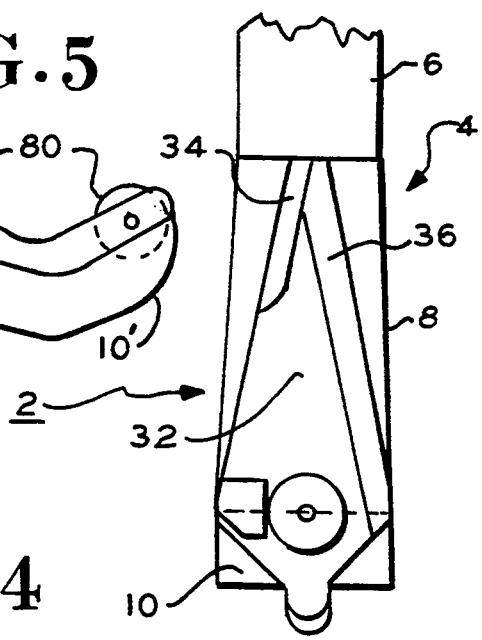
FIG. 1　FIG. 2　FIG. 3　FIG. 4　FIG. 5

5,345,682

TUBE CUTTER

FIELD OF THE INVENTION

This invention relates to tube cutters, and more particularly, to tube cutters which provide a resilient load on the cutter element.

BACKGROUND OF THE INVENTION

Tube cutters are usually C-shaped structures having an anvil on one end of an arm and a cutter advancing mechanism at the other arm end. In use, a tube is inserted between a cutter wheel attached to the anvil and a second cutter wheel attached to the advancing mechanism. Some structures provide only one cutter wheel, others two or more. The mechanism, typically a threaded or ratchet operated device, is employed to manually advance one of the cutter wheels toward the anvil or a force applying member toward the anvil containing a cutter wheel. As the mechanism is operated, the tube is manually rotated against the cutter wheel or wheels. As the cutter wheel or wheels penetrate the tube, the cutting force is dissipated relatively quickly requiring further advance of the force applying member. This is relatively cumbersome.

SUMMARY OF THE INVENTION

The present inventors recognize a need for a tube cutter in which stored energy is present relative to the cutter wheel and tube so that the tube can be rotated a reasonable value prior to reapplying a cutting force. Further, a need is seen for a low cost cutter utilizing a minimum number of components. A tube cutter according to the present invention comprises a frame including an arm, an anvil and a drive support, the anvil and drive support extending from the arm in spaced juxtaposed relation. Cutter means are secured to one of the anvil and drive support for cutting a tube supported on the anvil in response to an axial force thereon. Drive means are secured to the drive support for applying the axial force on the supported tube and for urging the tube against the cutter means to cut the tube, at least one of the anvil and arm being dimensioned and constructed such that the axial force resiliently displaces the anvil from a normal quiescent state to a displaced state creating stored energy such that rotation of the tube causes the cutter means to penetrate the tube in response to an axial force, the axial force being sufficiently high in value such that the stored energy continues to cause the cutter means to cut the tube as the cutter means penetrates the tube about the tube periphery, the anvil returning to its normal state in response to the release of the stored energy as the tube is rotated and cut.

IN THE DRAWING:

FIG. 1 is a side elevation view partially in section of a tube cutter according to an embodiment of the present invention;

FIG. 2 is a front elevation view of the cutter of FIG. 1;

FIG. 3 is a rear elevation view of the cutter of FIG. 1;

FIG. 4 is a side elevation fragmented view of a second embodiment of the present invention; and FIG. 5 is a side elevation view of the anvil with additional cutters according to a second embodiment.

DESCRIPTION OF THE PREFERRED EMBODIMENTS

In FIGS. 1–3, cutter 2 comprises a frame 4 of preferably molded fiber reinforced nylon, commercially available in one form as ZYTEL, a registered trademark of Du Pont. The frame 4 comprises a drive support 6, an arm 8 and an anvil 10. The support 6 is generally circular cylindrical having a longitudinal threaded bore 12 extending along axis 14. A knob 16 attached to drive mechanism 18 axially displaces along axis 14 a cutter wheel 20 rotatably attached to a mandrel 22 in response to rotation of the knob. This mechanism is conventional and need not be described in further detail herein.

The arm 8 is important as it is dimensioned so as to permit the anvil 10 to rotate and displace in direction 24 in response to an axial force on the anvil in direction 26. The axial force is created by wheel 20 being forced against a tube 28 (shown in phantom) during cutting in response to rotation of knob 16. The arm is shaped as follows. The arm 8 has a rectangular in transverse section which has a thickness t which is a millimum in region 30 along distance d. A rib 32 of somewhat triangular shape in plan view, FIG. 3, is formed at the rear of the arm 8. Other ribs 34 and 36 are adjacent to rib 32. The ribs 32, 34 and 36 are primarily decorative and may provide some additional strength to the arm 8. The dimensions and shape of the ribs is not critical as what is important is that the arm bend in direction 24 in response to a torque on its end 38 in direction 24 induced by the axial force on anvil 10 in direction 26. By way of example, when formed of ZYTEL, the arm 8 section 30 may have a dimension t of about 0.25 inches and a transverse width w, FIG. 2, of about one inch. The dimension w narrows toward support 6 about 10% to 20%. The widest portion is adjacent to anvil 10. The rib 32 increases in thickness as it extends from end 38 toward support 6 wherein the rib 32 is integral with the support 6 to form a generally cylindrical structure.

The support 6 at its junction with the arm 8 is relatively thick and rigid so that the transition to the thinner section 30 results in the bending of arm 8 at this location. The anvil 10 is relatively stiff and an axial force thereon causes a moment to be created directed against end 38 in direction 24, bending arm 8 relative to support 6. This rotatably displaces the anvil in direction 24 and in the axial direction 26.

The anvil 10 has a V-shaped groove 15 in side elevation as shown in FIG. 1 having planar tube support surfaces 11 and 13 which meet at junction 46. Junction 46 is on axis 14. The tube 28 is received in the groove 15 which is formed by anvil surfaces 11 and 13. Surfaces 11 and 13 are normal to the plane of the drawing figure and align the received tube 28 centrally on axis 14. The tube longitudinal dimension is parallel to arm 8 dimension w and is normal to axis 14. The anvil 10 includes a depending rib 40 and a V-shaped flange 42 from which the rib depends. The anvil 10 is relatively rigid.

In operation, the wheel 20, which lies in a plane normal to junction 46 and surfaces 11 and 13, is advanced against the tube 28 resting on surfaces 11 and 13. A force is created in axial direction 26 through the center of the tube sufficient to bend arm 8 in direction 24 to the position shown in phantom at 44. This displaces the anvil junction 46 in direction 24 to the left in the drawing. This offsets junction 46 from axis 14. This offset is acceptable for small displacements, e.g., up to about 0.070 inches. Further offset displacement of the tube center from axis 14 in direction 24 is undesirable as it may cause what is known as tracking rather than cutting of the tube in which spiral cuts are formed in the tube rather than a planar cut. The resilient load on the tube is sufficient to permit the tube to be cut for more than one revolution of the tube without advancing the cutting wheel 20, e.g., about 1½ revolutions of the tube, the tube being rotated manually as typical in this art. This is more efficient than having to advance the cutter wheel after each revolution of the tube. Of course, further revolutions can be cut in a single advance of the wheel 20 by providing further displacement of the anvil 10. This can be accomplished without without introducing a tracking problem by axially displacing the anvil as occurs with the embodiment of FIG. 4.

In FIG. 4, cutter device 60 comprises an arm 62, a drive support 64 and an anvil 66. The drive support is identical to the support 6 of device 2, FIG. 1. The arm 62, however, has a thickness t' greater than thickness t of device 2, the material forming device 60 being the same as for device 2. The thickness t' is such that the arm is rigid and does not bend in response to a bending moment created by an axial force on the anvil 66 in direction 68 along axis 70. The anvil in contrast has a primary portion 71 of rectangular cross section of thickness t" at its junction with arm 62. A rib 73 depends from portion 71. Rib 73 may have a thickness equivalent to the ribs 32, 34 and 36 in bending strength. Thickness t" may be the same as thickness t, FIG. 1 for example so that the anvil 66 bends in direction 72 about a fulcrum adjacent to its junction with arm 62 in response to bending torques of similar magnitudes as imposed on arm 8 of the device 2 of FIG. 1. The thickness t" may be set to any value according to the expected loads in direction 68 and to provide a preset resilient displacement in direction 72 in response such loads.

In the FIG. 1 embodiment, the maximum displacement of anvil in direction 24 should be about 0.070 inches to preclude tracking problems. However, since anvil 66 of FIG. 4 displaces generally in direction 68, the tracking problem is a minimum and anvil 66 may displace greater amounts so that more stored energy is present in such a displaced anvil. This permits further rotation angles of the tube beyond one revolution during cutting prior to each advance step of the cutter wheel 20.

In FIG. 1, surfaces 11 and 13 forming the V channel for receiving tube 28 engage the tube peripheral surface while the tube is rotated during cutting. These surfaces burnish the tube peripheral surface removing oxides or other contaminents. This avoids the need for a separate burnishing operation.

In FIG. 5, an alternative embodiment is shown in which a pair of cutter wheels 80 are rotatably secured to the anvil 10'. The cutter wheels 80 are in addition to the wheel 20 of FIGS. 1 and 4. Bending of the anvil relative to the cutter wheel 20 occurs in the presence of wheels 80 in the embodiments of FIGS. 1 and 4.

It will occur that various modifications to the disclosed embodiments may be made to one of ordinary skill in this art. Such modifications are intended to be included to the extent defined in the appended claims.

What is claimed is:

1. A tube cutter comprising:
   a frame including an arm means, an anvil means and a drive support, said anvil means and drive support extending from said arm means in spaced juxtaposed relation;
   cutter means secured to one of said anvil means and drive support for cutting a tube supported on said anvil means in response to an axial force on the supported tube; and
   drive means secured to said drive support for applying said axial force on said supported tube and for urging the cutter means against said tube to cut the tube, at least one of said anvil means and arm means being sufficiently resilient such that the anvil means in response to said axial force applied thereto resiliently displaces from a normal quiescent position to a displaced position creating stored energy in the frame such that said cutter means penetrates said tube in response to said axial force, said axial force being sufficiently high in value such that the stored energy continues to cause the cutter means to cut said tube as the cutter means penetrates the tube about the tube periphery as the tube is rotated, said anvil means gradually returning to its normal position in response to the release of said stored energy as said tube is rotated and cut, said arm means having a thickness sufficiently thin such that the arm means bends transversely relative to the direction of the axial force in response to said axial force and the anvil means displaces transversely relative to the axial direction of said force in response to said bending of said arm means.

2. The cutter of claim 1 wherein said anvil is V-shaped, one of said anvil and drive means having a surface which frictionally engages said tube for removing surface contamination during rotation of the tube during said cutting, said cutter means including a cutter wheel secured to the other of said anvil and drive means.

3. The cutter of claim 2 wherein the arm means, drive support and anvil means are molded thermoplastic.

4. The cutter of claim 1 wherein said cutter means includes a cutter wheel secured to said drive means.

5. The cutter of claim 4 wherein said drive means includes manual advance means for manually advancing said cutter toward said anvil means for creating said axial force.

6. The cutter of claim 1 wherein said drive means includes means for manually advancing said drive means toward said anvil means for creating said axial force.

7. The cutter of claim 1 wherein said frame comprises glass reinforced nylon.

8. The cutter of claim 7 wherein the frame comprises glass fiber reinforced nylon having a tensile strength of about 22,000 psi.

9. A tube cutter comprising:
   a nylon molded frame means including an arm, an anvil, and a drive support, said anvil and drive support extending from said arm in opposing spaced juxtaposed relation relative to each other;
   cutter means including a cutter wheel secured to one of said anvil and drive support for cutting a tube supported on said anvil in response to an axial force between the cutter means and the supported tube; and
   manual drive means secured to said drive support for manually applying said axial force on said supported tube and for advancing and urging the cutter means against said tube to cut the tube, said frame means being sufficiently resilient such that said axial force resiliently displaces said anvil from a normal quiescent position to a displaced position creating stored energy in the frame means such that said cutter means penetrates said tube in response to said axial force, said axial force being sufficiently high in value such that the stored energy continues to cause the cutter means to cut said tube as the cutter means penetrates the tube to different depths during rotation of the tube, said anvil gradually returning to its normal position in response to the resulting release of said stored energy as said tube is rotated and cut to said different depths, said energy being sufficiently high so that the tube is rotated at least approximately one turn before said energy is dissipated by said cutting.

10. The cutter of claim 9 wherein said cutter wheel a plane, said arm has a minimum thickness of about 0.25 inches in said plane transverse to the direction of said axial force, said arm having a length in direction generally in the direction of said axial force of at least about one inch and a width transverse said thickness and said length of about one inch, said nylon comprising glass fiber reinforced nylon.

11. The cutter of claim 9 wherein the arm has a length and a transverse thickness such that the arm bends resiliently transversely relative to the axial force direction and the anvil is displaced transversely and axially in response to said force on said anvil.

12. The cutter of claim 9 wherein the anvil displaces substantially in the axial direction in response to said force on said anvil.

13. The cutter of claim 12 wherein the arm has a thickness of about 20 to 30% the arm width adjacent to the drive support.

14. A tube cutter comprising:
a frame including an arm means, an anvil means and a drive support, said anvil means and drive support extending from said arm means in spaced juxtaposed relation;
cutter means secured to one of said anvil means and drive support for cutting a tube supported on said anvil means in response to an axial force on the supported tube; and
drive means secured to said drive support for applying said axial force on said supported tube and for urging the cutter means against said tube to cut the tube, at least one of said anvil means and arm means being sufficiently resilient such that the anvil means in response to said axial force applied thereto resiliently displaces from a normal quiescent position to a displaced position creating stored energy in the frame such that said cutter means penetrates said tube in response to said axial force, said axial force being sufficiently high in value such that the stored energy continues to cause the cutter means to cut said tube as the cutter means penetrates the tube about the tube periphery as the tube is rotated, said anvil means gradually returning to its normal position in response to the release of said stored energy as said tube is rotated and cut, said anvil means being attached to the arm means at a joint, said joint having a cross sectional area sufficiently small such that the anvil means displaces at least generally in the direction of said axial force in response to said axial force on said anvil means.

15. The cutter of claim 14 wherein said anvil means is V-shaped, one of said anvil means and drive means having a surface which frictionally engages said tube for removing surface contamination during rotation of the tube during said cutting, said cutter means including a cutter wheel secured to the other of said anvil means and drive means.

16. The cutter of claim 14 wherein said frame comprises glass reinforced nylon.

17. The cutter of claim 14 wherein the junction of the arm to the anvil has a thickness such that said anvil means displaces relative to the arm generally in the direction of said axial force.

18. A tube cutter comprising:
a frame including an arm means, an anvil means and drive support, said anvil means and drive support extending from said arm means in spaced juxtaposed relation;
cutter means secured to one of said anvil means and drive support for cutting a tube supported on said anvil means in response to an axial force on the supported tube; and
drive means secured to said drive support for applying said axial force on said supported tube and for urging the cutter means against said tube to cut the tube, at least one of said anvil means and arm means being sufficiently resilient such that the anvil means in response to said axial force applied thereto resiliently displaces from a normal quiescent position to a displaced position creating stored energy in the frame such that said cutter means penetrates said tube in response to said axial force, said axial force being sufficiently high in value such that the stored energy continues to cause the cutter means to cut said tube as the cutter means penetrates the tube about the tube periphery as the tube is rotated, said anvil means gradually returning to its normal position in response to the release of said stored energy as said tube is rotated and cut, said arm means extending generally in the direction of said axial force and having a thickness of a certain value transverse said latter direction and a length of a given value along that latter direction such that the arm means resiliently displaces in a direction transverse said axial force direction in response to said axial force on said anvil means.

19. The cutter of claim 18 wherein said anvil means is V-shaped, one of said anvil means and drive means having a surface which frictionally engages said tube for removing surface contamination during rotation of the tube during said cutting, said cutter means including a cutter wheel secured to the other of said anvil means and drive means.

20. The cutter of claim 18 wherein the frame comprises reinforced nylon.

21. The cutter of claim 18 wherein the junction of the arm means to the anvil is dimensioned such that said anvil means displaces relative to the arm means generally in the direction of said axial force.

22. A tube cutter comprising:
a frame including an arm means, an anvil means and a drive support, said anvil and drive support extending from said arm means in spaced juxtaposed relation;
cutter means secured to one of said anvil means and drive support for cutting a tube supported on said anvil means in response to an axial force on the supported tube; and
drive means secured to said drive support for applying said axial force on said supported tube and for urging the cutter means against said tube to cut the tube, at least one of said anvil means and arm means being sufficiently resilient such that the anvil means in response to said axial force applied thereto resiliently displaces from a normal quiescent position to a displaced position creating stored energy in the frame such that said cutter means penetrates said tube in response to said axial force, said axial force being sufficiently high in value such that the stored energy continues to cause the cutter means to cut said tube as the cutter means penetrates the tube about the tube periphery as the tube is rotated, said anvil means gradually returning to its normal position in response to the release of said stored energy as said tube is rotated and cut said anvil means being attached to said arm means at a junction, the junction of the arm means and anvil means having a thickness sufficiently small such that said anvil means displaces relative to the arm means at least generally in the direction of said axial force in response to said axial force on said anvil means.

23. The cutter of claim 22 wherein said anvil means is V-shaped, one of said anvil means and drive means having a surface which frictionally engages said tube for removing surface contamination during rotation of the tube during said cutting, said cutter means including a cutter wheel secured to the other of said anvil means and drive means.

* * * * *

UNITED STATES PATENT AND TRADEMARK OFFICE
CERTIFICATE OF CORRECTION

PATENT NO.  : 5,345,682
DATED       : September 13, 1994
INVENTOR(S) : Miles J. Dubinsky, et al.

It is certified that error appears in the above-indentified patent and that said Letters Patent is hereby corrected as shown below:

```
Column 5,
Claim 10, line 1, after "wheel" insert -- lies in --;
          line 4, after "in" insert -- a --.
Column 5,
Claim 22, line 3, after "anvil" insert -- means --.
```

Signed and Sealed this

Twenty-fourth Day of January, 1995

Attest:

BRUCE LEHMAN

*Attesting Officer*  *Commissioner of Patents and Trademarks*